US012571745B2

(12) United States Patent
Kuhl et al.

(10) Patent No.: US 12,571,745 B2
(45) Date of Patent: Mar. 10, 2026

(54) 2D POLYMER BASED TARGETS FOR SERIAL X-RAY CRYSTALLOGRAPHY

(71) Applicant: THE REGENTS OF THE UNIVERSITY OF CALIFORNIA, Oakland, CA (US)

(72) Inventors: Tonya L. Kuhl, Sacramento, CA (US); Deepshika Shamraj Gilbile, San Francisco, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 259 days.

(21) Appl. No.: 18/358,572

(22) Filed: Jul. 25, 2023

(65) Prior Publication Data

US 2023/0417689 A1 Dec. 28, 2023

Related U.S. Application Data

(63) Continuation of application No. PCT/US2022/014748, filed on Feb. 1, 2022.
(Continued)

(51) Int. Cl.
*G01N 23/20025* (2018.01)
*G01N 1/36* (2006.01)

(52) U.S. Cl.
CPC ......... *G01N 23/20025* (2013.01); *G01N 1/36* (2013.01); *G01N 2001/368* (2013.01)

(58) Field of Classification Search
CPC ......... B01L 2200/027; B01L 2300/161; B01L 3/06; B01L 3/502707; G01N 1/36;
(Continued)

(56) References Cited

U.S. PATENT DOCUMENTS 5,848,122 A     12/1998  Kurtz
10,365,188 B2 *  7/2019  Fraden .............. B01L 3/502761
(Continued)

OTHER PUBLICATIONS

Guha S, Perry SL, Pawate AS, Kenis PJ. Fabrication of X-ray compatible microfluidic platforms for protein crystallization. Sens Actuators B Chem. Nov. 2012;174:1-9. doi: 10.1016/j.snb.2012.08. 048. PMID: 23105172; PMCID: PMC3480190. (Year: 2012).*
(Continued)

*Primary Examiner* — David J Makiya
*Assistant Examiner* — Miya Downing
(74) *Attorney, Agent, or Firm* — O'BANION & RITCHEY LLP; John P. O'Banion

(57) ABSTRACT

Systems and methods for producing and using polymer based fixed targets for hydrated, room temperature, high-throughput serial protein crystallography with minimal background and minimal sample consumption are provided. The fixed targets can also be used with non-protein samples such as nanoparticle inorganic crystals. The targets maintain full crystal hydration that allows for on-chip crystallization as well as maintaining long term stability of the sample within the chip. The target chips are optimized to minimize background by controlling the sample thickness in the beam to match crystal size, enabling fast raster scanning at lower fidelity and high hit rates that facilitate dynamic measurements. The targets provide an inexpensive, flexible substrate for on-chip, micro-batch or vapor diffusion crystallization facilitated by polymer brushes for sample concentration and surface initiated crystallization thereby eliminating damaging crystal sample transfer.

11 Claims, 6 Drawing Sheets

Related U.S. Application Data

(60) Provisional application No. 63/144,248, filed on Feb. 1, 2021.

(58) Field of Classification Search
CPC ....... G01N 2001/368; G01N 2223/612; G01N 23/20008; G01N 23/20025; G01N 23/201
See application file for complete search history.

(56) References Cited

U.S. PATENT DOCUMENTS

| | | |
|---|---|---|
| 2012/0021523 A1 | 1/2012 | Fowler |
| 2012/0120226 A1 | 5/2012 | De Jonge |
| 2019/0383764 A1 | 12/2019 | Perry |
| 2020/0256811 A1* | 8/2020 | Thorne ............ G01N 23/20025 |
| 2020/0384440 A1 | 12/2020 | Tezcan |

OTHER PUBLICATIONS

Keller, Nico, et al., "Tacky cyclic olefin copolymer: a biocompatible bonding technique for the fabrication of microfluidic channels in COC", Royal Society of Chemistry, Lab Chip, 16, pp. 1561-1564.

ISA/US, United States Patent and Trademark Office (USPTO), International Search Report and Written Opinion issued May 13, 2022, related PCT international application No. PCT/US2022/014748, pp. 1-7, with claims searched, pp. 8-12.

Hunter, Mark S., et al. "Fixed-target protein serial microcrystallography with an x-ray free electron laser", Scientific reports, 4, 6026, 2014, pp. 1-5.

Frank, Matthias, et al. "Femtosecond X-ray diffraction from two-dimensional protein crystals" IUCrJ, vol. 1, Part 2, 2014, pp. 95-100.

Seuring, Carolin, et al. "Femtosecond X-ray coherent diffraction of aligned amyloid fibrils on low background graphene." Nature communications 9.1 (2018): 1836.

Sui, Shuo, et al., "Graphene-based microfluidics for serial crystallography", Lab on a Chip, 16.16, 2016, pp. 3082-3096.

Feld, Geoffrey K., et al. "Low-Z polymer sample supports for fixed-target serial femtosecond X-ray crystallography", Journal of Applied Crystallography, 48.4, 2015, pp. 1072-1079.

Ghazal, Aghiad, et al. "Recent advances in X-ray compatible microfluidics for applications in soft materials and life sciences", Lab on a Chip, Royal Society of Chemistry, 16.22, 2016, pp. 4263-4295.

Georgakilas, Vasilios, et al. "Functionalization of graphene: covalent and non-covalent approaches, derivatives and applications" Chemical reviews, ACS Publications, 112.11, 2012, pp. 6156-6214.

Wang, Qing Hua, et al. "Understanding and controlling the substrate effect on graphene electron-transfer chemistry via reactivity imprint lithography." Nature chemistry 4.9, Aug. 12, 2012, pp. 1-9.

Brisset, Florian, et al. "Surface functionalization of cyclic olefin copolymer with aryldiazonium salts: A covalent grafting method", Applied Surface Science, vol. 329, 2015, pp. 337-346.

Pu, Qiaosheng, et al. "On-chip micropatterning of plastic (cylic olefin copolymer, COC) microfluidic channels for the fabrication of biomolecule microarrays using photografting methods." Langmuir 23.3, 2007, pp. 1577-1583.

Chen, Ruichao, et al. "Construction of DNA microarrays on cyclic olefin copolymer surfaces using confined photocatalytic oxidation." RSC Advances 4.87, 2014, pp. 46653-46661.

Carvalho, Rui Rijo, et al. "Mild and Selective C—H Activation of COC Microfluidic Channels Allowing Covalent Multifunctional Coatings." ACS applied materials & interfaces 9.19, 2017, pp. 16644-16650.

* cited by examiner

100

110 — Prepare a Pattern Transparency

120 — Prepare Silicon Masters From The Patterned Design

130 — Prepare a Negative Pattern From The Silicon Master

140 — Emboss Negative Pattern Onto COC Films

150 — Ion Etch Residual Films

160 — Spin Coat Window Films

170 — Process COC Thin Films

180 — Optional COC Thin Film Surface Functionalization

190 — Prepare Spacer

200 — Prepare Support Frame and Chip Assembly

2D POLYMER BASED TARGETS FOR SERIAL X-RAY CRYSTALLOGRAPHY

CROSS-REFERENCE TO RELATED APPLICATIONS

This application claims priority to, and is a 35 U.S.C. § 111(a) continuation of, PCT international application number PCT/US2022/014748 filed on Feb. 1, 2022, incorporated herein by reference in its entirety, which claims priority to, and the benefit of, U.S. provisional patent application Ser. No. 63/144,248 filed on Feb. 1, 2021, incorporated herein by reference in its entirety. Priority is claimed to each of the foregoing applications.

The above-referenced PCT international application was published as PCT International Publication No. WO 2022/165422 A1 on Aug. 4, 2022, which publication is incorporated herein by reference in its entirety.

STATEMENT REGARDING FEDERALLY SPONSORED RESEARCH OR DEVELOPMENT

This invention was made with government support under Grant Number GM117342, awarded by the National Institutes of Health (NIH) and Grant Number 1231306, awarded by the National Science Foundation (NSF). The government has certain rights in the invention.

NOTICE OF MATERIAL SUBJECT TO COPYRIGHT PROTECTION

BACKGROUND

1. Technical Field

This technology pertains generally to crystallography and molecular structure diagnostic systems and methods and more particularly to a crystal sample support apparatus and high through put analysis methods that deliver or hold protein crystal samples for beam diffraction characterization.

2. Background

The determination of the three-dimensional structure of biomacromolecules and their complexes is a very important part of structural biology and medicine. An accurate three-dimensional structure of a target protein or similar complex structure can then be utilized to predict the functionality and behavior of the biomolecule as well as identify mechanisms of activity.

One common diagnostic method for identifying the ternary structure of complex molecules, such as native proteins, nucleic acids, or protein-ligand complexes, is with Xray diffraction of macromolecular crystals. The application of a high-intensity beam of X-rays to a crystalline form of a molecule will produce unique patterns of diffracted radiation from the crystal that have characteristic spatial intensities and distributions that are dependent on the atomic structure of the crystal and the wavelength of the beam. Analysis of the acquired diffraction data from the crystalline form of the molecule can be used to calculate the three-dimensional structure of the molecule.

Consequently, crystallization techniques are important for producing high-quality crystals of a target molecule to be analyzed by x-ray diffraction. Growing diffraction-quality crystals in order to obtain useful X-ray diffraction data is generally difficult and may be impossible in practice. This difficulty is due to the highly complex structure of typical biological molecules and that complex structure often interferes with the formation of ordered crystalline structures.

X-ray diffraction (XRD) of large single crystals or crystalline powders are conventional crystallography techniques used for three dimensional structural determinations of biomolecules. In conventional crystallography, a relatively large single crystal is rotated to different orientations relative to an impinging X-ray beam to produce a distinctive diffraction pattern in order to collect a 3D data set. Similarly, the X-ray diffraction from a crystalline powder sample also generates a distinctive pattern. A powder sample is scanned with an X-ray beam along with a detector that measures the intensity of radiation diffracted by the sample as a function of the diffraction angle to provide the pattern. Unfortunately, crystallization of complex biomolecules into a sufficiently large single crystal is difficult and crystal size may be a limiting factor.

Typical powder diffraction instruments need between 100 to 500 milligrams of material to produce sufficient pattern data. Because well ordered, stable crystals tend to generate higher quality X-ray diffraction data, crystallization conditions need to be optimized to produce crystals of satisfactory quality, size and quantity for these techniques.

The advent of new, high repetition rate, micro-focused X-ray free electron laser (XFEL) sources has enabled crystals of much smaller volume (<10 $\mu m^3$) to be characterized. Serial femtosecond crystallography (SFX) is a form of X-ray crystallography developed for the use of X-ray free-electron lasers and allows structural determinations from micro or nanocrystals of biomolecules like proteins at room temperature. Rather than irradiating a single crystal as in traditional crystallography, SFX scans usually involve the injection of a continuous stream of randomly oriented protein crystals through the path of the XFEL beam. A diffraction snapshot is produced from each crystal that is hit by the XFEL beam and all of the snapshots are then merged to form the dataset. Unfortunately, the collection of diffraction data from many crystals is necessary to produce a full data set because the use of an XFEL beam of sufficient intensity necessary to generate diffraction patterns will also destroy the sub-micron crystals.

Delivering micro-crystal samples efficiently and effectively to an XFEL beam has been a challenge. A number of different approaches have been used to deliver or hold protein crystal samples for SFX diffraction characterization. The two main crystal delivery methods are fixed targets and liquid jets. Fixed target systems place crystals in a sample holder and they do not move in the holder during diffraction. Rather, the sample holder is moved within the beam to sequentially expose different crystals to the beam. However, the need to transfer crystals to fixed targets, grids and similar systems increases the risk of damaging or destroying the crystals before diffraction can take place.

Liquid jet crystal delivery systems for XFEL diffraction continuously stream a thin column or droplets of liquid containing crystals across an intersection point with the XFEL beam. The use of a stream of liquid provides the benefit of maintaining crystal hydration and minimizing background. However, liquid jet crystal delivery systems also face difficulties with high sample consumption, jet clogging and low data collection efficiency.

Accordingly, there is a need for crystal delivery methods and structures for performing high throughput screening of crystallized target materials to utilize the full potential of XFEL.

BRIEF SUMMARY

Functionalized polymer fixed targets for hydrated, room temperature, high-throughput serial protein crystallography is described. The targets are inexpensive, robust, rapidly fabricated polymer-based chips that maintain protein crystal hydration that allow on-chip crystallization as well as sample stability on chip for days to weeks. The target chips are optimized to minimize background by controlling the sample thickness in the beam to match the crystal size enabling fast raster scanning at lower fidelity and high hit rates that facilitate dynamic measurements.

The targets provide a flexible substrate for on-chip, micro-batch or vapor diffusion crystallization, or for protein crystal slurry loading for structural characterization by X-ray diffraction. The fixed targets can also be used for supporting non-protein samples such as nanoparticle inorganic crystals.

In one embodiment, the delivery method is a fixed target that is entirely polymer based and has been developed for both synchrotron and XFEL sources. For example, the target chip can be used with laboratory scale, $2^{nd}$ and $3^{rd}$ generation X-ray sources, including XFELs.

The use of amorphous, low-Z, thin flexible polymer films (COC/PMMA or Epoxy/PMMA) with low X-ray attenuation has enabled low water permeation rates and enduring hydration conditions. Importantly, the polymer films can be chemically functionalized with binding groups to selectively nucleate and grow protein crystals in situ at desired locations with high yield. Aqueous film thickness (chamber size) can also be tailored to match the protein crystal size to dramatically reduce solution background.

The developed fabrication method allows for rapid prototyping, ease of manufacturing, fast turnaround, and eliminates the stringent beam shot positioning requirements of silicon-based chips. The polymer chips can also be optimized quickly for each sample and for ease of specific sample loading. Finally, the polymer chip design is compatible with reaction-triggered strategies such as optical excitation, application of electric field gradients, and microfluidic mixing to access structural changes during triggered biological function and dynamic events.

According to one aspect of the technology, an apparatus and methods are provided that enables tuning of the 2D sample support/delivery polymer chip to match the crystal dimensions or crystallization conditions while minimizing background and to be compatible with any current X-ray sources including synchrotrons and different XFEL systems.

According to another aspect of the technology, a polymer target is provided where very little crystal sample is consumed during X-ray or XFEL measurements.

Another aspect of the technology is to provide a target that is very easy to load and handle, maintains full crystal hydration, maintains long term stability of the sample and is inexpensive to manufacture (single-use and disposable).

Another aspect of the technology is to provide an in situ crystal growth system that is amenable to surface functionalization using routine chemistries for selective protein concentration, crystal growth and binding.

A further aspect of the technology is to provide stable target apparatus with a flexible design for optimization based on X-ray beam line characteristics and crystal dimensions (e.g., from micron to mm).

Another aspect is to provide a crystallization-on-chip approach that eliminates the need to handle fragile crystals, allows for easy sample monitoring or screening and permits direct-to-beamline shipment that can allows remote, automated experiments on fixed targets to be possible at synchrotrons or XFELs. Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawings which are for illustrative purposes only.

DETAILED DESCRIPTION

Referring more specifically to the drawings, for illustrative purposes, systems, devices and methods for fabricating and using polymer based microfluidic targets for serial crystallography are generally shown. Several embodiments of the technology are described generally in FIG. 1 to FIG. 7 to illustrate the characteristics and functionality of the devices, systems and methods. It will be appreciated that the methods may vary as to the specific steps and sequence and the systems and apparatus may vary as to structural details without departing from the basic concepts as disclosed herein. The method steps are merely exemplary of the order that these steps may occur. The steps may occur in any order that is desired, such that it still performs the goals of the claimed technology.

Figure 1:
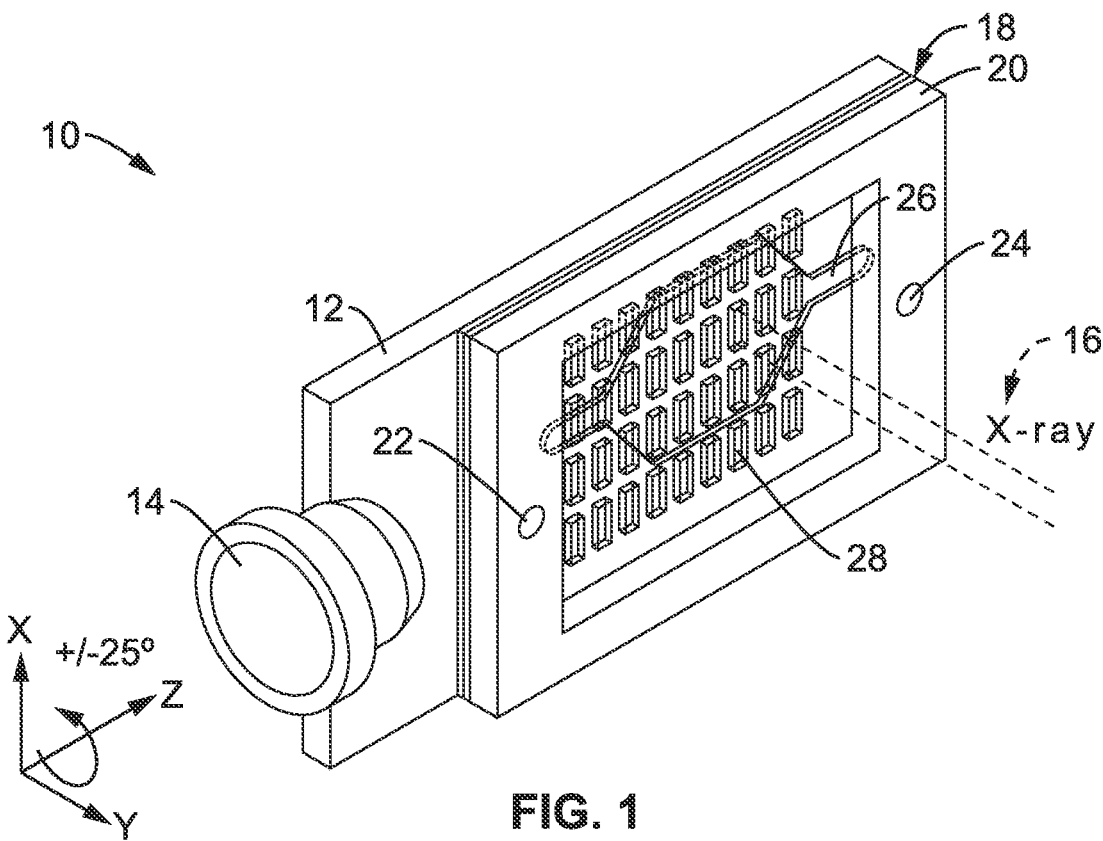
FIG. 1 is a front perspective view of an enclosed fixed target chip with tunable low background supports and sample flow chambers or channels according to one embodiment of the technology.

Turning now to FIG. 1, an embodiment of a polymer fixed target chip and system for serial X-ray or XFEL crystallography is shown schematically. The target chips 10 are inexpensive, robust, rapidly fabricated polymer-based chips that maintain protein crystal hydration, are optimized to minimize background by controlling the sample thickness in the beam to match the crystal size, enable fast raster scanning at lower fidelity, and provide high hit rates to facilitate dynamic measurements. In another embodiment, the target chip structure allows for on-chip crystallization as well as on-chip sample stability for days to weeks.

In the illustrative embodiment 10 of FIG. 1, the target base platform 12 with a mounting bracket 14 that is configured to allow rapid vertical, horizontal and rotational movements of the base platform orthogonally to the beam path 16.

Patterned polymer film and membrane layers 18 are sandwiched between the outer frame 20 and the base platform 12. The outer frame 20 also has an inlet port 22 and an outlet port 24 in the embodiment shown in FIG. 1. The inlet port 22 and the outlet port 24 are fluidly coupled with one or more sample flow layer channels or chambers 26 that have tunable dimensions. The channels and chambers 26 that are bounded by two thin polymer membrane film layers and two patterned polymer layers.

The tunable dimensions of a spacing sample flow layer 26 and associated volume of channel/chambers, allow the dimensions of the chamber to be matched to the crystal sizes of the sample and substantially reduce the solution background.

The patterned polymer layers have an aligned window pattern with four rows of vertically oriented rectangular shaped windows 28. Beam 16 interactions with microcrystals within the flow layer channels or chambers occur through these windows 28 in this embodiment.

Figure 2:
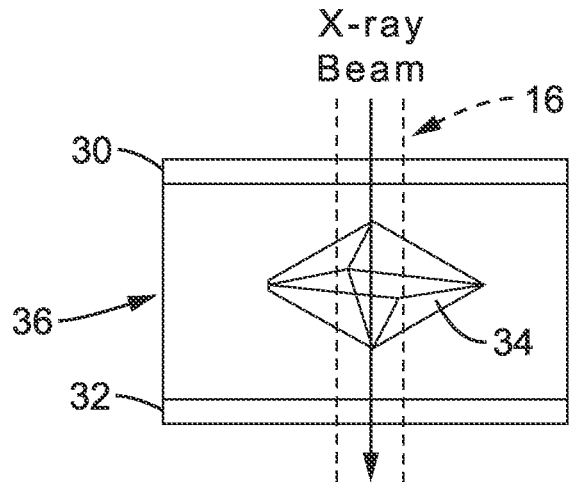
FIG. 2 is a schematic detailed view of a protein diffraction measurement of a crystal within a chamber of the target chip.

A detail of this interaction of beam 16 with a crystal 34 through a window 28 is shown schematically in the cross-section illustrated in FIG. 2. The flow layer channel or chamber 36 is formed between a top thin film layer and a bottom thin film layer 32. The vertical distance between the top thin film layer 30 and a bottom thin film layer 32 can be increased or decreased to match the size of crystal 34 as shown in FIG. 2. Much of the observed scatter background often comes from air in the sample chamber and tuning the dimensions of the channel 36 reduces the available air spaces. In addition, the controlled dimensions generally separate and orient the crystals 34 linearly and distributed along approximately the same plane. This puts each crystal 34 that is hit at about the same distance from the beam source thereby reducing variations in distance.

Figure 3:
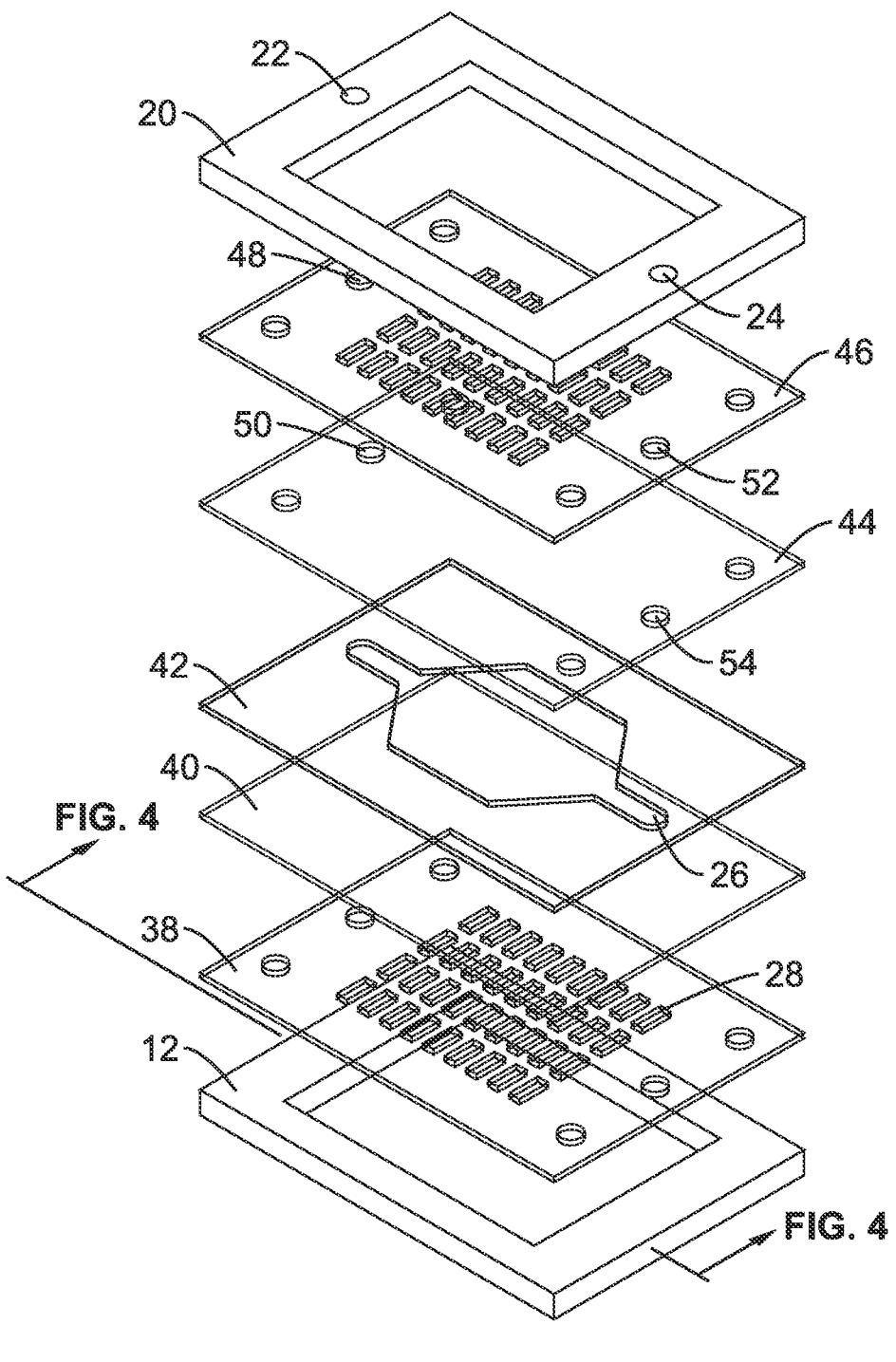
FIG. 3 is an exploded perspective view of the target structure showing the various layers that are ultimately bonded together using solvent treatment or adhesives layers.

The layers forming the polymer fixed target chip 10 can be seen in the exploded perspective view of FIG. 3. In FIG. 3, the base platform layer 12 is a rigid polymer layer that is shown without a mounting bracket. The next layer, from bottom to top, is the bottom patterned polymer layer 38. This patterned layer 38 barrier layers 40, 44 are preferably made from cyclic olefin copolymers (COC) that are a class of thermoplastic polymers with excellent water barrier properties and very low X-ray attenuation. They also have a range of glass transition temperatures (78° C. to 170° C.) that are amenable to hot-embossing based microfabrication.

The next layer that is mounted to the lower patterned layer 38 is an ultra-thin barrier layer 40. This barrier layer 40 forms the bottom surface of the chamber or channel 26 that is formed along with the sample flow layer 42 and the ultra-thin top barrier layer 44. Accordingly, the sample will be fully enclosed by and between low permeability polymer barrier layers 40, 44 and walls defined by the sample flow layer spacer 42.

The shape of the openings circumscribed in the spacer 42 can be varied from a single opening producing a single chamber as illustrated, or multiple openings can be provided in the spacer such as a plurality of parallel channels or multiple chambers each supported by separate microfluids.

The thickness of the sample flow layer spacer 42 can be varied to control the space between the top barrier layer 44 and the bottom barrier layer 40. The thickness of the spacing sample flow layer 42 can also be matched to the crystal size, typically 10 microns to 150 microns, resulting in a dramatic reduction in background. This is crucially important for small, fragile, and weakly diffracting crystals.

The pattern of the channels/chamber 26 formed in the sample flow spacer layer 42 can also be varied to control the individual chamber volume and conditions within the chamber 26. Long term storage at high relative humidity enables sample preparation 1 to 2 weeks in advance and pre-screening of samples to be run at beamline, for example.

While controlled chamber 26 conditions permit X-ray diffraction at room temperature and full hydration, while minimizing background solution scattering. Controlled chamber conditions may also permit a crystallization-on-chip approach. Variations in the chamber/channel 26 pattern and thickness of sample flow layer 42 spacers can also provide control over the crystallization conditions tuned for a particular protein or other targets.

Accordingly, the dimensions of the sample flow layer openings and the design of the openings can be selected to allow either loading of crystal slurries through the input port 22 or the loading of solutions for crystallization within the chambers of the chip, or both.

A top patterned polymer layer 46 is placed over the top barrier layer 44 that preferably has a pattern that matches the bottom patterned polymer layer 38 and is oriented on the chip so the windows 28 align in this embodiment. This orientation allows a clear path for a beam 16 to pass through each of the individual windows 28 in the pattern as shown in FIG. 1 and FIG. 3.

A rigid polymer top frame 20 with inlet port 22 and outlet port 24 is placed over the top patterned polymer layer 46 and aligned in this embodiment. The inlet port 22 is aligned over a corresponding access port 48 in the top patterned polymer layer 46 as well as port 50 in the top thin film layer 30 providing access to the interior of channel/chamber 26. Likewise, outlet port 24 of the top frame 20 is oriented over access port 52 of the top patterned polymer layer 46 and port 54 in the top film layer 44.

In the embodiment shown, a fluid or slurry flow into and out of the chambers of the chip can be established. In another embodiment, the inlet port 22 and outlet port 24 can be used to evacuate gasses from the channels and chambers creating a vacuum surrounding the crystals. In this embodiment, the inlet 22 and outlet 24 holes may be opened prior to pulling vacuum in the sample holding chamber. The crystals will dehydrate over time, but x-ray measurements can be conducted for tens of minutes or longer depending on the crystals.

Although a single fluidic flow into and out of a single chamber is illustrated, it will be understood that the chip may have multiple inlets, outlets and multiple chambers. A single inlet to a dead-end chamber without an outlet may also be designed.

Figure 4:
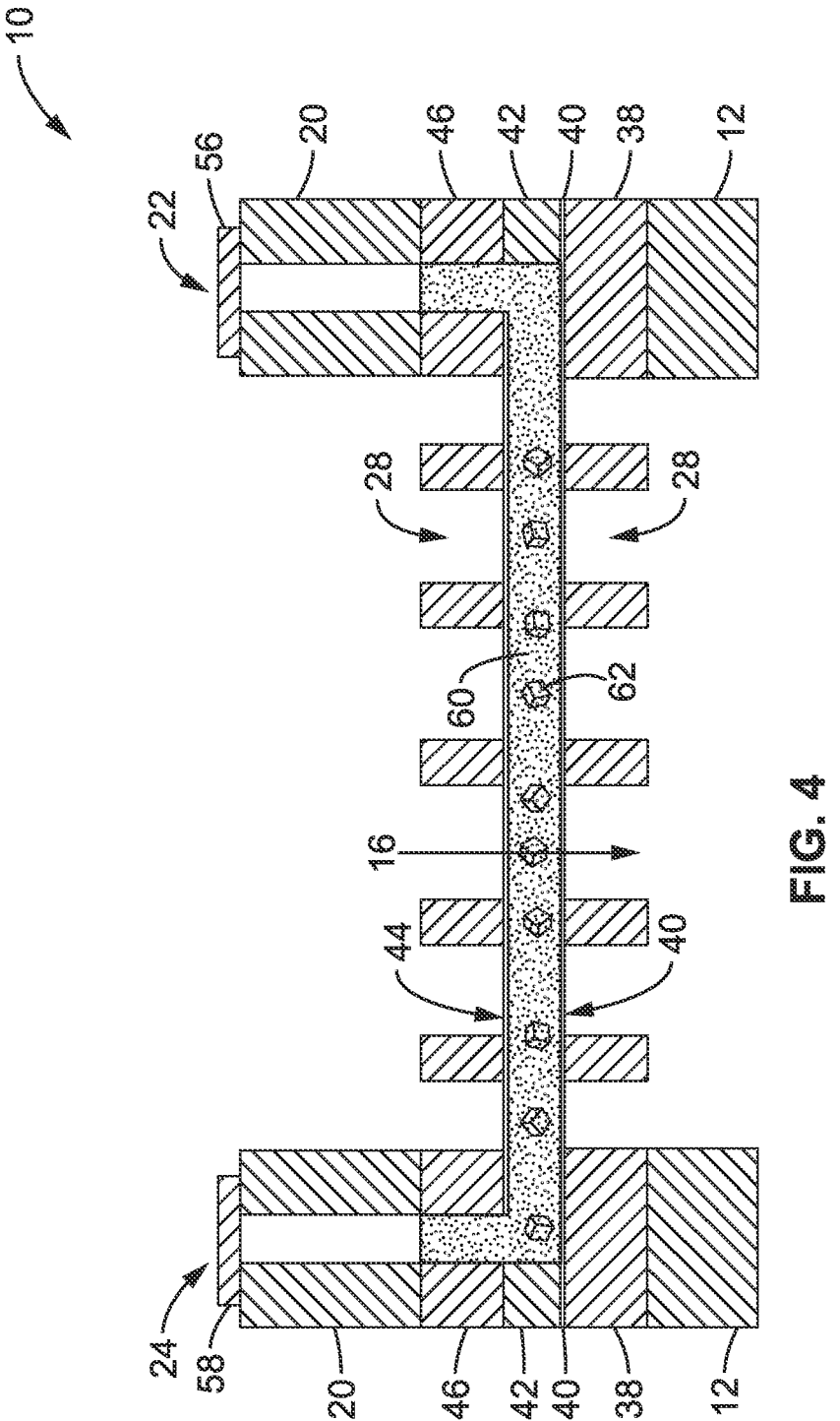
FIG. 4 is a schematic cross-sectional view of the fabricated polymer based fixed target microfluidic chip embodiment shown in FIG. 3.

A cross-section of an assembled chip of FIG. 3 taken across the inlet and outlet ports and windows is shown schematically in FIG. 4 to further illustrate the internal chamber structure and target crystal distribution. As seen in FIG. 4, a solution or slurry 60 of crystals 62 has been introduced to the chip 10 through the inlet port 22 and a film 56 has been placed over the port 22 to close access. The outlet port 24 of frame 20 has also been sealed with a film 58. The solution 60 entered through the access port 48 of top patterned layer 46 and into the chamber.

In one embodiment, the protein microcrystals 62 are grown in situ within the chamber from a mother liquor or similar solution. On-chip crystallization with either micro-batch or vapor diffusion are preferred in this embodiment. The crystallization-on-chip approach eliminates the need to handle fragile crystals, allows for easy sample monitoring or screening and direct-to-beamline shipment that allows remote, automated experiments on fixed targets within syn-chrotron or XFEL systems.

Control over the crystallization conditions and evapora-tion rate is provided through the selection of chamber 26 dimensions and architecture as well as the use of thin support barrier films 40, 44 that offer water barrier proper-ties. Other parameters, such as temperature, pH and solvent selection, may also be optimized to enhance crystal forma-tion and morphology within the chambers. Controllable chamber dimensions also allow X-ray diffraction measure-ments from small crystals matched to beam size and from weakly diffracting materials.

In another embodiment, the bottom barrier film 40 or the top barrier film 44 may be chemically functionalized with binding groups to selectively nucleate and grow protein crystals in-situ at desired locations with high yield. For example, Ultraviolet light initiated photo-grafting reactions can simultaneously pattern and functionalize COC thin films with polymer-brushes with different functional groups. Dis-sociable groups such as carboxylic acid groups can be used to concentrate basic proteins on the treated surfaces.

Hanging drop vapor diffusion or micro-batch crystalliza-tion can be set up on functionalized barrier layers. Electro-static interactions or covalent binding between proteins and polymer brushes creates a local super saturation of sample molecules to induce crystallization.

In one preferred embodiment, polyacrylic acid (PAA) brushes are patterned onto COC surfaces using an acrylic acid monomer solution with a benzophenone photo-initiator. Protein crystals have been shown to preferentially nucleate on the COC-PAA regions.

Accordingly, chemical functionalization of the barrier films 40 with high fidelity (20-micron resolution) have been shown to control crystal distribution. This enables the spac-ing of crystals to be decided based on (desired/actual) crystal size and density, thereby minimizing sample consumption while allowing high hit-rates at high repetition rates.

Figure 5:
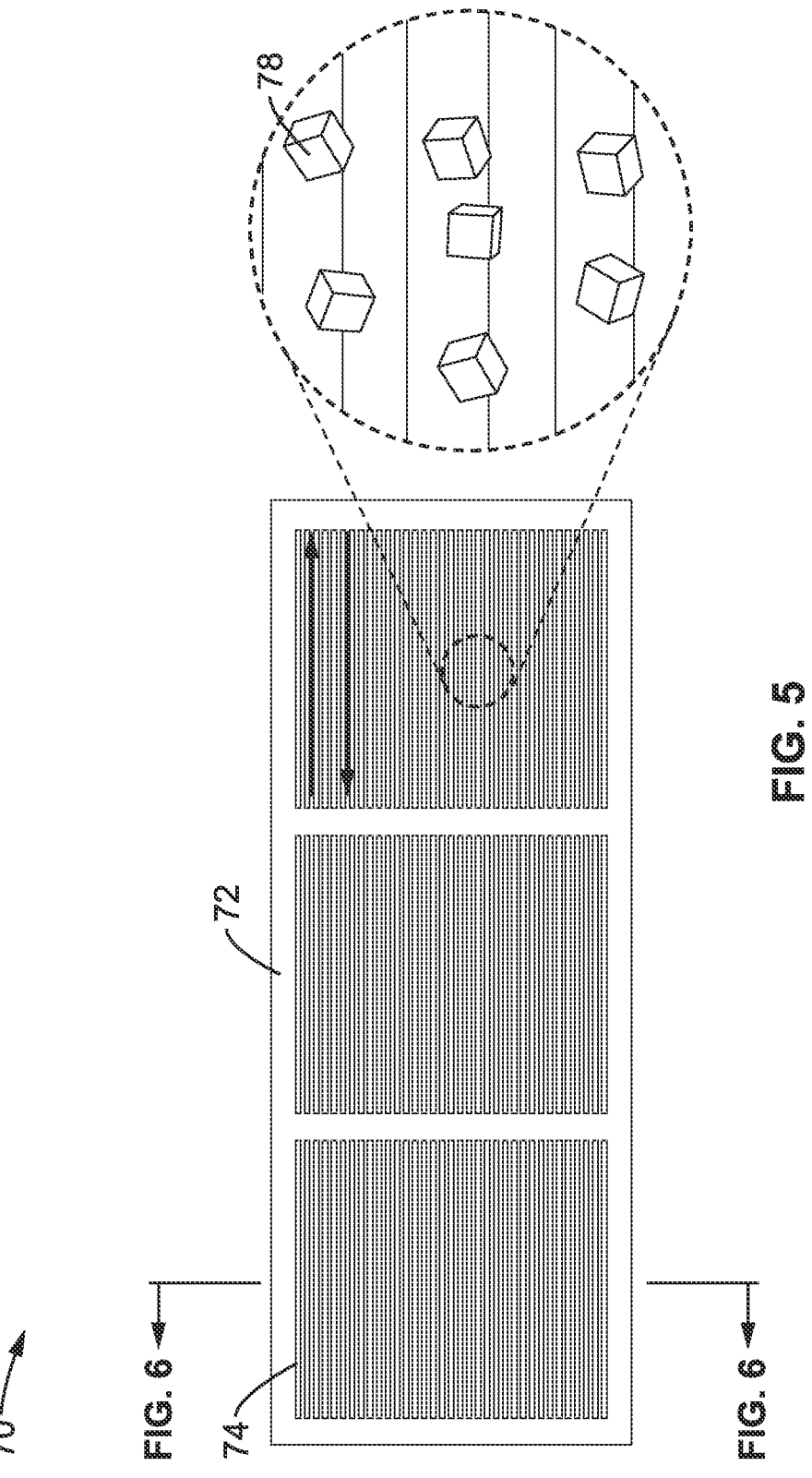
FIG. 5 is a schematic front view of an alternative embodiment of a polymer fixed target with three columns of slots for high repetition rate measurements according to the technology.
Figure 6:
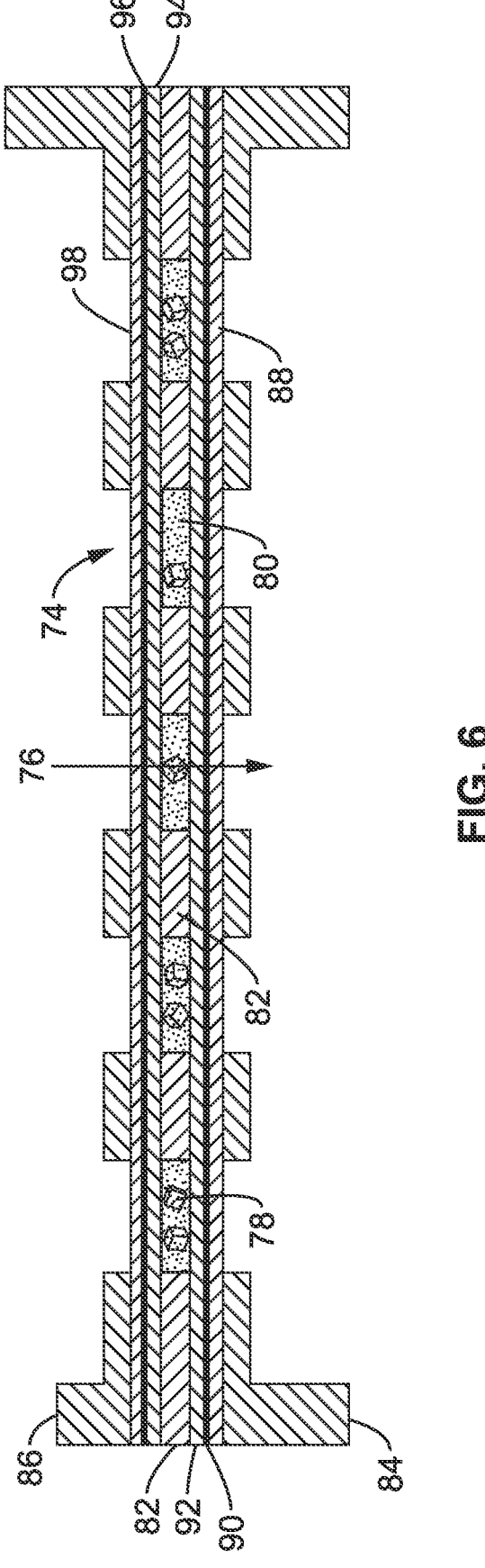
FIG. 6 is a schematic cross-sectional view of the target of FIG. 5 showing a graphene layer sandwiched between thin polymer films and patterned polymer surface functionalization to induce crystallization at defined locations.

An alternative embodiment of a COC polymer chip 70 design with columns of parallel slots for high repetition rate measurements is shown in FIG. 5 and FIG. 6. A front view of the top patterned COC polymer layer 72 is shown without frames in FIG. 5. In this embodiment, there are three columns of horizontal windows 74. The windows 74 open to channels formed between thin polymer films separated by spacers as seen in FIG. 6. Crystals 78 are dispersed along the length of the channels as illustrated in the inset of FIG. 5. The arrows show the preferred scanning direction of the beam 76 along the lengths of the windows 74 of target 70.

As seen in the cross-section of FIG. 6, the crystals 78 reside in parallel channels 80 that are formed between a top barrier film layer and a bottom barrier film layer separated by spacers 82. The thin barrier films are supported by a bottom patterned COC polymer layer 84 and a top patterned COC polymer layer 86 and sandwiched between the two polymer layers. The patterned windows 74 of the top layer 86 and the bottom layer 84 are aligned so the beam 76 has a clear path through the windows 74.

In the embodiment shown in FIG. 6, the top and bottom barrier films are formed from composites of very thin films with a graphene layer in between. CVD graphene or Langmuir-Blodgett self-assembled layers of graphene (LB-graphene) can be used in conjugation with flexible polymer films to improve the barrier properties of support layers. The bottom barrier layer is a composite of a base film 88, a graphene layer 90 and an interior facing upper film layer 92. Similarly, the top barrier layer is a composite of an interior facing base film layer 94, a middle graphene layer 96 and an outward facing upper film layer 98.

In one embodiment, the interior surfaces 92, 94 of the barrier films are functionalized with patterning of polymer brushes to induce localized crystallization. In one embodi-ment, UV photografting of PAA brushes creates a pattern of spots at regular and discrete locations along the length of each of the channels 80. The scanning and/or pulse rate of beam 76 exposures correspond to the brush locations along the channels 80 to optimize hit rates and minimize protein sample consumption. In another embodiment, seed crystals are dispersed along the channels 80 to initiate crystallization of larger crystals within the channels to tune on-chip crys-tallization.

The environment of the channels 80 can be controlled and optimized for crystallization conditions or provide a hydrated environment for storage and delivery with spacers 82. The thickness dimension of the spacers 82 can be varied to define the volume of the channels 80 to provide control conditions as well as the crystal size and density.

In another embodiment, the channels 80 are integrated with microfluidics and other modalities to allow for micro-fluidic mixing strategies and the easy introduction of small ligands. It can be seen that the device and system can be adapted to perform many different chip-based, time-resolved experiments like ligand soaking or reaction triggered reac-tions such as UV-photoexcitation as well as permit the application of electric field gradients.

Figure 7:
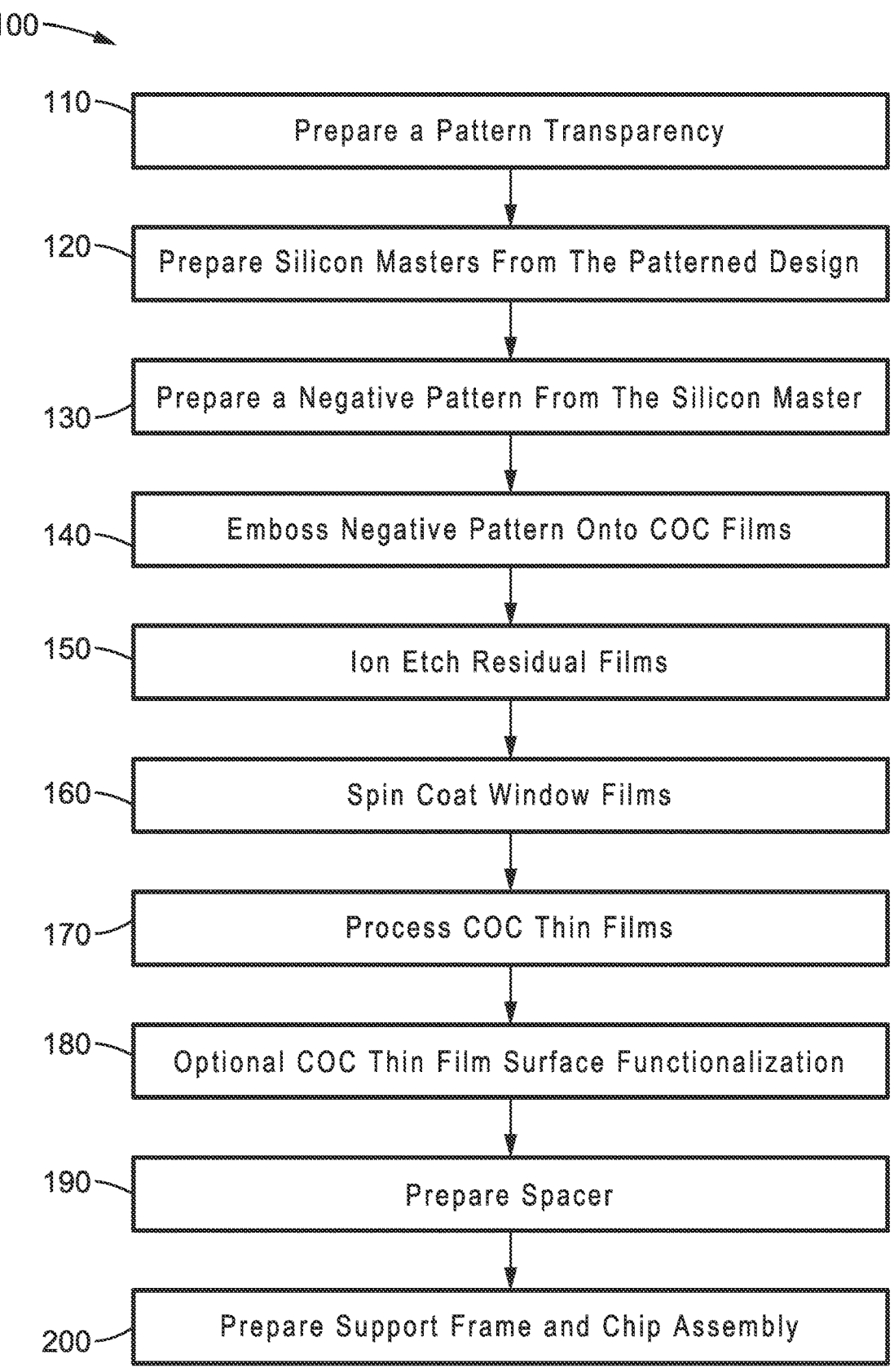
FIG. 7 is a functional block diagram of a method for fabricating a polymer fixed target chip for serial protein crystallography according to one embodiment of the technology.

Fabrication of enclosed chamber polymer fixed targets for serial crystallography according to one embodiment of the technology is shown schematically in FIG. 7. The process 100 for fabricating the COC polymer substrates is straight forward and compatible with current semi-conductor style manufacturing using process steps that are all readily avail-able in clean room facilities.

Referring now to FIG. 7, the process 100 in this embodi-ment begins the preparation of a pattern transparency at block 110. The substrate pattern transparencies may be designed with computer assisted drawing programs.

The pattern transparency that is prepared at block 110 is used to produce a silicon master at block 120 using con-ventional procedures. It should be noted that multiple pat-terns can be created from a single 6" silicon master at block 120 to enable a variety of sample volumes, X-ray windows. However, fabricating the silicon master to render duplicate patterns is more advantageous for producing multiple poly-mer chips during one processing step. It is a trade-off between having different chip geometries or reproducing the same chip for rapid through-put.

At block 130, a negative pattern or replica is made off of the silicon master produce at block 120 that is preferably made from polydimethylsiloxane (PDMS) or similar mate-rial. The negative pattern or replica produced at block 130 is then used to emboss COC films at block 140. For example, using the PDMS replica, the PDMS pattern may be hot embossed onto COC films of about 140-micron in thickness to provide integrity to the thin COC window film with the use of a clean room hot embosser/wafer bonder. The 140-micron thickness COC film may be anchored to a silicon wafer with a spin-coated polyvinyl alcohol (PVA) layer. For this step, the wafers may optionally be first UV ozone treated for 15 to 30 minutes to render the surface hydrophilic. Next, a 9% PVA (22K M W) in water is spun at 2000 rpm for 60 seconds on the silicon wafer for the hot embossing process.

This is important because the PVA layer acts like a tether and release layer between the embossed COC film and the wafer during the reactive ion etching process described at block 140. Other materials could potentially be used as the sacrificial/tether layer, but PVA works well, is inexpensive, and dissolves in an orthogonal solvent such as water as compared to the organic sec-butylbenzene used with COC.

Residual films from hot embossing are reactive ion etched to make through holes or other opening configurations as desired in the COC films at block 150 of FIG. 7.

Polymer window films are spin coated at block 160. The thin COC window films are preferably spin-coated films on UV ozone treated silicon wafers to the desired film thickness, which are bonded to the thicker hot-embossed COC supports through solvent treatment and detached from the wafer by water immersion. The thin COC window films are continuous and may be fabricated by spin-coating at 2000 rpm onto UV ozone cleaned silicon wafers, for example. The COC film thickness is normally controlled by the solution concentration. For example, a 17.5 wt % 8007 COC dissolved in sec-butylbenzene solution yields a film that is 3.7 μm in thickness.

Film thicknesses of approximately 2 microns to 4 microns have low X-ray scatter background and are easy to physically handle. Thinner films can be used to further minimize X-ray scatter background.

The COC films are then processed at block 170 of FIG. 7. The spun COC films are preferably post baked at 100° C. for 15 minutes to drive off residual solvent. The spun thin films are then bonded to the thicker hot-embossed COC supports through solvent treatment and detached from the wafer by water immersion.

One solvent treatment method utilizes a filter paper stack wetted with a vol % cyclyohexane:acetone solution in a glass petri-dish. The COC hot embossed frame (smooth, wafer facing side) is placed on the filter paper stack for 1 minute, dried in a stream of nitrogen gas, and then pressed onto the spin coated COC film on the silicon wafer. Only after the adhesion of the thicker COC frame is the thin COC film on the silicon wafer delaminated.

The delamination step is an important component of chip fabrication and preferably does not use any traditional release or delamination layers. The COC film is deposited directly on the clean silicon wafer and then the thicker COC frame is bonded to the thin film by solvent exposure. To release the composite, the edges of the thin film on the silicon wafer are scored with a sharp blade. This is followed by slow/gentle immersion in water that slowly penetrates, raises and separates the thin film. Support of the thin film at separation is provided with a silicon wafer that helps to prevent surface defects in the free-standing film regions during separation. Depending on the COC thin-film thickness, however, delamination can be done without immersion in water in some embodiments.

One or more surfaces of the COC thin films may optionally be functionalized at block 180. For example, the COC thin films may be oxygen-plasma treated for 1 to 2 minutes prior to assembly with spacer layers to render the surface hydrophilic and enhance solution wetting and sample loading on the chip. The material typically retains the hydrophilicity for more than 30 days after the oxygen-plasma treatment.

After oxygen-plasma treatment, the COC thin-film surfaces can also be functionalized by ultra-violet light photografting. Quartz photomasks can be used to selectively, covalently UV light reactive monomers (e.g. acrylic acid monomers but many different chemical functionalities can be used) in the solution directly onto the COC thin film. This enables selective deposition, anchoring, and growth of protein crystals in a controlled manner directly on the chip in the selected regions. Fidelity to 20 microns is easily obtainable. All of the COC thin film processing and chemical modification is preferably conducted while the fragile film is supported on a silicon wafer.

A spacer structure is prepared block 190 that has a thickness that modulates and defines the volume of the chamber to channel formed between thin polymer films. In one preferred embodiment, an acrylic adhesive layer is laser cut to match the COC frame structure and act as a spacer, solution "flow" layer. The adhesive film thickness can be selected between tens to hundreds of microns to match the crystal size. The acrylic adhesive layer is used to adhere two COC thin film/frame layers to make an enclosed microfluidic chip with flow inlet and outlets. In another embodiment, the spacers are made at block 190 from patterned COC or PDMS films.

Finally, at block 200, the frame supports are made, and the final chip structure is assembled. For example, thick PMMA (poly methyl methacrylate) supports of about 0.5 mm to 1 mm in thickness may be laser cut to the desired sizes and adhered using acrylic adhesive films to the delaminated and adhered COC thin films with previously made frame layers. The thick PMMA supports provide rigidity to the target chips and make the samples easy to handle. In addition, beam alignment tabs may be included in the thick PMMA supports to enable easy sample positioning in the X-ray beam.

The assembly of the chip around the spacers or spacer layer forming one or more chambers is required for samples in liquids or slurries. In another embodiment, however, a "half-sandwich" (i.e., open single COC thin-film supported by the PMMA frame) sample may be used with an XFEL beam line. The sample is a dried nano-crystalline inorganic sample. In this case there is no need to maintain hydration. Therefore, it is possible to just use the "half-sandwich" structure to provide a support for the sample and ability to scan the sample in the X-ray beam.

The technology described herein may be better understood with reference to the accompanying examples, which are intended for purposes of illustration only and should not be construed as in any sense limiting the scope of the technology described herein as defined in the claims appended hereto.

Example 1

In order to demonstrate the functionality of the devices and methods, a polymer fixed target chip with the structure illustrated in FIG. 1 and FIG. 3 was fabricated and tested. The device had a chamber or flow layer with two barrier layers of COC films that were 2 to 4 microns in thickness and separated by spacers ranging from between 10 microns and 150 microns in thickness. The windows in the fabricated 200 µm thick patterned polymer layer were 0.5 mm by 1.75 mm vertical slits with about a 3 micron barrier film thickness and about 50 micron thick flow layer. The frames that were tested were between 0.5 mm and 1 mm thick and made from poly-methyl methacrylate (PMMA). The thick PMMA supports provide rigidity to the chips and make samples easy to handle.

Initially, the water vapor transmission rate through the COC thin films was evaluated during storage and during diffraction. The Chips were shown to be stable over several weeks in a humidified environment before measurements. It was found that less than 1% volume loss/hour in ambient conditions during sample measurement. The water loss can be controlled by the COC film thickness (L) and the relative humidity of the environment where the polymer chip is stored.

The enclosed chamber of the chips provided good conditions for incubation or storage in high relative humidity environment. This set-up could be used under controlled humidity conditions to carry out micro-batch or vapor diffusion crystallization.

However, an oxygen barrier layer might be necessary for long term storage of enclosed material because high water-barrier materials like COC, PE, PP have notoriously high oxygen permeation. EVOH (ethylene-co-vinyl alcohol) was found to have one of the best oxygen barrier properties.

Example 2

For comparison with crystalline slurries, thaumatin and lysozyme crystals grown on-chip for measurement at SSRL 12-1 beamline. Polymer surface functionalization of a COC film on a silicon wafer base was performed with an acrylic acid monomer solution with photo-initiator was applied to the COC film and overlayed with a quartz photomask to produce polymer brushes.

Crystallization conditions for lysozyme for microbatch crystallization with 1:1 protein:precipitant was 30 mg/mL Lysozyme in 20 mM Sodium Acetate, pH 4.6:1M NaCl 0.1M Sodium Acetate, pH 4.6. Electrostatic interaction driven crystallization of the lysozyme protein was observed on the functionalized COC surfaces. Crystals were shown to preferentially nucleate on the COC-PAA regions. Similar results were observed with thaumatin. The test samples of lysozyme were crystallized in-situ on 100-micron PAA square patterns with multiple crystals grown selectively on each pattern.

Diffraction measurements of the crystals grown in situ on the chip and stored for several days were taken at room temperature with the SSRL 12-1 beamline @12.4 keV and 5 µm×50 µm beam size. The crystals diffracted to 1.7 Å at room temperature and full hydration.

The results showed minimal background overall compared to diffraction signal and minimal contribution from polymer films. Contributions from the buffer could be tuned b optimizing the spacer versus crystal thickness. The majority of the scatter background is contribution was from air in the sample chamber.

This confirmed that crystal samples could be grown in situ on patterned PAA brushes and provide concentrated crystal targets at specified locations.

From the description herein, it will be appreciated that the present disclosure encompasses multiple implementations which include, but are not limited to, the following:

A fixed target apparatus for serial x-ray crystallography, the apparatus comprising: (a) a rigid base frame; (b) a base polymer sheet mounted to the base frame, the sheet patterned with at least one window; (c) a bottom low water permeability barrier film; (d) a top low water permeability barrier film; (e) spacers separating the bottom low permeability barrier film from the top low permeability barrier film, the spacers and barrier films forming at least one chamber; (f) an upper polymer sheet patterned with at least one window; and (g) an upper rigid frame.

The apparatus of any preceding or following implementation, further comprising a target mounting bracket coupled with the rigid base frame, the mounting bracket configured to fit in an X-ray or XFEL diffractometer.

The apparatus of any preceding or following implementation, further comprising one or more input channels fluidly coupled to at least one input port in the top ridged frame and to at least one chamber; and one or more output channels fluidly coupled to at least one chamber and to at least one output port in the top ridged frame; wherein fluids can be introduced to at least one chamber through the input port; and wherein fluids or gases can be withdrawn from at least one chamber through the output port.

The apparatus of any preceding or following implementation, wherein the input channels, output channels and the at least one chamber further comprise surface treatments producing a hydrophilic surface for improved sample loading of the apparatus.

The apparatus of any preceding or following implementation, wherein the surface treatment comprises an oxygen-plasma treatment.

The apparatus of any preceding or following implementation, wherein the pattern of windows of the patterned upper and lower polymer sheets comprises parallel rows of elongate windows configured to allow controlled exposure of a chamber interion to an orthogonal beam through the windows.

The apparatus of any preceding or following implementation, wherein the spacers comprise a planar spacer layer with an open center pattern circumscribing one or more chambers, the spacer layer having a thickness that defines a volume of the one or more chambers.

The apparatus of any preceding or following implementation, wherein the spacer layer has a chamber pattern selected from the group of patterns consisting of a plurality of parallel channels, a single central chamber, and a chamber with radiating channels.

The apparatus of any preceding or following implementation, wherein the bottom low water permeability barrier film and the top low water permeability barrier film each comprise an outer cyclic olefin copolymer (COC) thin film layer; a graphene layer; and an inner cyclic olefin copolymer (COC) thin film layer, the inner thin film layer having a surface facing an interior of the chamber.

The apparatus of any preceding or following implementation, the at least one chamber further comprising barrier film surface functionalization for surface-initiated sample crystallization and in situ diffraction.

The apparatus of any preceding or following implementation, wherein the barrier film surface functionalization comprises ultraviolet light photografting of poly acrylic acid brushes onto film surface regions; and wherein target proteins are concentrated and crystallized at the surface regions.

A fixed target apparatus for serial x-ray crystallography, the apparatus comprising: (a) a top polymer frame with at least one inlet port and at least one outlet port; (b) an upper polymer sheet mounted to the top frame, the sheet patterned with a plurality of windows; (c) at least one microfluidic chamber, each chamber comprising (i) an upper barrier film; (ii) a lower barrier film; (iii) a spacer layer separating the upper barrier film from the lower barrier film, the spacer having open center patterns circumscribing the chamber, the spacer layer having a thickness that defines a volume of the chamber; (iv) an inlet channel fluidly coupled to at least one microfluidic chamber and the inlet port; and (v) an outlet channel fluidly coupled to the outlet port and the at least one microfluidic chamber; (d) a bottom polymer sheet patterned with a plurality of windows, the sheet mounted to the lower barrier film of the microfluidic chamber; and (e) a bottom polymer frame mounted to the patterned bottom polymer sheet.

The apparatus of any preceding or following implementation, wherein the spacer layer thickness enables tuning of chamber volume to match target crystal dimensions and crystallization conditions while minimizing background.

The apparatus of any preceding or following implementation, the at least one chamber further comprising barrier film surface functionalization for surface-initiated sample crystallization and in situ diffraction.

The apparatus of any preceding or following implementation, wherein the upper and lower barrier each comprise an outer cyclic olefin copolymer (COC) thin film layer; a graphene layer; and an inner cyclic olefin copolymer (COC) thin film layer, the inner thin film layer having a surface facing an interior of the chamber.

A method for producing a fixed target for serial x-ray crystallography, the method comprising: (a) providing a first polymer sheet and a second polymer sheet, each sheet patterned with the same plurality of openings; (b) mounting a thin polymer layer on the first polymer sheet and on the second polymer sheet; (c) functionalizing an outer surface of the thin polymer layers on the patterned polymer sheets; (d) providing a spacer layer with an opening defining a chamber shape and a thickness that defines a chamber volume; (e) mounting the first thin polymer layer and first patterned polymer sheet to the spacer layer; and (f) mounting the second thin polymer layer and second patterned polymer sheet to the spacer layer forming a chamber.

The method of any preceding or following implementation, wherein the thin polymer layer surface functionalization comprises: ultraviolet light photografting of poly acrylic acid brushes onto selected layer surface regions; wherein target proteins are concentrated and crystallized at the surface regions.

The method of any preceding or following implementation, further comprising: providing a substrate pattern transparency of a patterned polymer sheet; producing a silicon master of the patterned design; forming a polydimethylsiloxane (PDMS) negative pattern from the silicon master; and hot embossing a desired pattern onto a COC film with the PDMS negative pattern to provide the first and second patterned polymer sheets.

The method of any preceding or following implementation, further comprising spin casting a thin barrier layer onto the embossed first and second patterned polymer sheets.

The method of any preceding or following implementation, further comprising laser cutting a top frame and a bottom frame; and mounting combined polymer sheets, polymer layers and spacer between frames.

A 2D polymer-based chip for serial x-ray crystallography.

A universal, polymer-based fixed-target chip for in-situ protein crystallization and crystallography using X-ray diffraction.

A polymer-based chip having one or more characteristics selected from the group consisting of being configured to: maintain protein crystal hydration, be optimized to minimize background, obtain high hit rates, be compatible with and/or facilitate dynamic measurements, and allow on-chip crystallization.

A polymer-based chip that is compatible with an X-Ray source selected from the group consisting of synchrotrons, different XFELs, and compact XFELs.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A fixed target apparatus for serial x-ray crystallography, the apparatus comprising:
   (a) a rigid base frame;
   (b) a base polymer sheet mounted to the base frame, said sheet patterned with at least one window;
   (c) a bottom low water permeability barrier film;
   (d) a top low water permeability barrier film;
   (e) spacers separating said bottom low permeability barrier film from said top low permeability barrier film, said spacers and barrier films forming at least one chamber;
   (f) an upper polymer sheet patterned with at least one window; and
   (g) an upper rigid frame;
   (h) said at least one chamber further comprising barrier film surface functionalization for surface-initiated sample crystallization and in situ diffraction.

2. The apparatus of claim 1, further comprising:
   a target mounting bracket coupled with said rigid base frame, said mounting bracket configured to fit in an X-ray or XFEL diffractometer.

3. The apparatus of claim 1, further comprising:
   one or more input channels fluidly coupled to at least one input port in said top ridged frame and to at least one chamber; and
   one or more output channels fluidly coupled to at least one chamber and to at least one output port in said top ridged frame;
   wherein fluids can be introduced to at least one chamber through the input port; and
   wherein fluids or gases can be withdrawn from at least one chamber through the output port.

4. The apparatus of claim 3, wherein said input channels, output channels and said at least one chamber further comprise surface treatments producing a hydrophilic surface for improved sample loading of the apparatus.

5. The apparatus of claim 4 wherein said surface treatment comprises an oxygen-plasma treatment.

6. The apparatus of claim 1, wherein said pattern of windows of said patterned upper and lower polymer sheets comprises parallel rows of elongate windows configured to allow controlled exposure of a chamber interion to an orthogonal beam through the windows.

7. The apparatus of claim 1, wherein said spacers comprise a planar spacer layer with an open center pattern circumscribing one or more chambers, said spacer layer having a thickness that defines a volume of said one or more chambers.

8. The apparatus of claim 7, wherein said spacer layer has a chamber pattern selected from the group of patterns consisting of a plurality of parallel channels, a single central chamber, and a chamber with radiating channels.

9. The apparatus of claim 1, wherein said barrier film surface functionalization comprises:
   ultraviolet light photografting of poly acrylic acid brushes onto film surface regions; and
   wherein target proteins are concentrated and crystallized at said surface regions.

10. A fixed target apparatus for serial x-ray crystallography, the apparatus comprising:

(a) a top polymer frame with at least one inlet port and at least one outlet port;

(b) an upper polymer sheet mounted to the top frame, said sheet patterned with a plurality of windows;

(c) at least one microfluidic chamber, each chamber comprising:

(i) an upper barrier film;

(ii) a lower barrier film;

(iii) a spacer layer separating said upper barrier film from said lower barrier film, said spacer having open center patterns circumscribing said chamber, said spacer layer having a thickness that defines a volume of said chamber;

(iv) an inlet channel fluidly coupled to at least one microfluidic chamber and said inlet port; and (v) an outlet channel fluidly coupled to said outlet port and said at least one microfluidic chamber;

(d) a bottom polymer sheet patterned with a plurality of windows, said sheet mounted to the lower barrier film of said microfluidic chamber; and (e) a bottom polymer frame mounted to the patterned bottom polymer sheet;

(f) wherein said spacer layer thickness enables tuning of chamber volume to match target crystal dimensions and crystallization conditions while minimizing background.

11. A fixed target apparatus for serial x-ray crystallography, the apparatus comprising:

(a) a top polymer frame with at least one inlet port and at least one outlet port;

(b) an upper polymer sheet mounted to the top frame, said sheet patterned with a plurality of windows;

(c) at least one microfluidic chamber, each chamber comprising:

(i) an upper barrier film;

(ii) a lower barrier film;

(iii) a spacer layer separating said upper barrier film from said lower barrier film, said spacer having open center patterns circumscribing said chamber, said spacer layer having a thickness that defines a volume of said chamber;

(iv) an inlet channel fluidly coupled to at least one microfluidic chamber and said inlet port; and (v) an outlet channel fluidly coupled to said outlet port and said at least one microfluidic chamber;

(d) a bottom polymer sheet patterned with a plurality of windows, said sheet mounted to the lower barrier film of said microfluidic chamber; and (e) a bottom polymer frame mounted to the patterned bottom polymer sheet;

(f said at least one chamber further comprising barrier film surface functionalization for surface-initiated sample crystallization and in situ diffraction.

\* \* \* \* \*